United States Patent Office 2,801,931
Patented Aug. 6, 1957

---

2,801,931

WELL CEMENTING COMPOSITION

Bryan E. Morgan and George K. Dumbauld, Houston, Tex., assignors, by mesne assignments, to Esso Research and Engineering Company, Elizabeth, N. J., a corporation of Delaware No Drawing. Application April 6, 1954,
Serial No. 421,432

11 Claims. (Cl. 106—90)

The present invention is directed to a cement composition. More particularly, the invention is directed to a cement composition adapted for use in oil wells and particularly a composition which develops a low strength on setting. In its more specific aspects, the invention is directed to a cement composition for use in oil wells and a method of preparing same.

This application is a continuation-in-part of Serial No. 267,922, entitled "Well Cementing Composition and Method of Preparing Same," filed January 23, 1952, for Bryan E. Morgan and George K. Dumbauld, now abandoned.

The present invention may be described briefly as involving a cement composition adapted for use in well cementing operations which comprises a Portland cement, a liquid hydrocarbon, a water soluble organic dispersing agent and a sufficient amount of water to provide a pumpable slurry when the components of the composition are admixed.

The cement used in our composition is Portland cement as described and specified in A. S. T. M. Designation: C-150. Such Portland cements are well known and readily available on the market.

The liquid hydrocarbon employed in our improved composition should have a viscosity below about 40 centipoises at 100° F., because hydrocarbons of high viscosity are generally heavier and are more difficult to emulsify. Preferably, the viscosity of the hydrocarbon should be below about 10 centipoises at 100° F. The liquid hydrocarbon may be a pure hydrocarbon or it may be a mixture of hydrocarbons. The liquid hydrocarbon may be a crude petroleum or it may be a fraction of crude petroleum, such as a gasoline, a kerosene, a gas oil or a diesel oil fraction. It may be desirable to use crude petroleum such as is found in adjacent oil wells in the field where the cementing operation is conducted or under some conditions it may be desirable to use a fuel oil which may be a kerosene or a diesel oil.

The liquid hydrocarbon, as described, may be employed in an amount in the range between about 15 cc. and about 60 cc. per 100 grams of dry cement. A preferred amount is in the range of 20 cc. to 40 cc. per 100 grams of the dry cement.

The water soluble organic dispersing agent may be any water soluble organic dispersing agent selected from a large class of such compounds. The water soluble organic dispersing agent may suitably be selected from the class of compounds possessing calcium tolerance as illustrated by the non-ionic agents.

We contemplate that our organic dispersing agent will include dietheylene glycol monolaurate and polyalkylene ether alcohol. Emulsifying agents are suitable organic dispersing agents for use in our invention. The emulsifying agents finding use in our invention are the polar, hydrophilic and lipophilic non-ionic compounds. These polar emulsifying compounds are of the ester, ether-alcohol, ether-ester type. As examples of the emulsifying agents finding use in the invention may be mentioned sorbitan mono-laurate, a condensation product of ethylene oxide, propylene oxide, and propylene glycol, polyoxyethylene lauryl alcohol, polyoxyethylene octl phenol, and the like.

While we have given numerous examples of our organic dispersing agent, it will be clear to the skilled workman that many compounds satisfying the requirement of being calcium tolerant may be used in lieu of the specific materials enumerated above.

The organic dispersing agent of the type illustrated may be used in an amount in the range between 0.1% and 1.0% by weight based on the dry cement. A preferred amount is in the range from 0.2% to 0.6% by weight.

The water should be employed in our improved composition in an amount sufficient to provide a pumpable slurry. An amount in the range between 50% and 100% by weight based on the dry cement will ordinarily be satisfactory with a preferred range from 60% to 80% by weight.

The preparation of our improved composition may be accomplished in several different ways. One method of forming a slurry in accordance with our composition which is adapted for use in well cementing operations is to make an emulsion of the water and the liquid hydrocarbon and thereafter admix with said emulsion a blend of the Portland cement and a water-soluble organic dispersing agent, the proportions of the water, hydrocarbon, and dispersing agent being in the ranges given above.

Another method of forming our improved composition may be employed and this comprises admixing water, a liquid hydrocarbon and a water soluble organic dispersing agent to form an emulsion, the water soluble organic dispersing agent serving as an emulsifying agent. Portland cement is then admixed with the emulsion to form our composition.

The composition of the present invention may also be formed by blending Portland cement with a water soluble organic dispersing agent in an amount in the range between 0.1% and 1.0% by weight based on the dry cement. The Portland cement and the organic dispersing agent are then admixed with water in an amount in the range between 50% and 100% by weight based on the dry cement to form a slurry. Liquid hydrocarbon is then admixed with the slurry in an amount in the range between 15 cc. and 60 cc. per 100 grams of the dry cement.

It is also desirable in some instances to add to our composition a small amount of a colloidal clay. The amount of the colloidal clay should be small since if large amounts are used it may be necessary either to decrease unduly the amount of the liquid hydrocarbon or to increase unduly the amount of the water included in the composition. The colloidal clay ordinarily should be employed in an amount no greater than 5% by weight based on the dry cement. As examples of suitable colloidal clays are those such as Wyoming bentonite clay, El Paso surface clay, and those clays including the montmorillonites and particularly the sodium montmorillonite. The calcium montmorillonite may be employed and suitable other salts of the montmorillonites may be used. The sodium montmorillonites, such as those encountered in Wyoming bentonite, are included in the preferred type of clay. Clays falling within the purview of our invention are described in the Carman patent, 1,460,788, and the Harth patent, 1,991,637.

When a colloidal clay of the type exemplified above is employed in our composition, the composition may be formed by any of the methods described above in which the clay has been blended with the dry cement prior to forming the slurry or it may be formed in the following manner:

The liquid hydrocarbon or oil component of our composition may be emulsified with water either in the presence or absence of an organic dispersing agent, such as calcium lignin sulfonate. To this emulsion may be added an amount of a colloidal clay not exceeding 5% by weight based on the dry cement to be used in the composition. By adding the colloidal clay to the emulsion, the clay is suitably hydrated and exerts a more beneficial effect than if it is added otherwise. To the emulsion containing the colloidal clay then may be added the Portland cement or the blend of Portland cement and organic dispersing agent in an amount sufficient to provide proportions of the composition as have been indicated above.

In all instances of the various methods which may be used in preparing our composition, it is to be understood that vigorous agitation is to be used to obtain intimate admixture of the composition.

In order to show the effectiveness of the emulsifying agents of the type illustrated in cement compositions, cement slurries made up of Lone Star Portland cement, water, kerosene and emulsifying agent, were formed and the filtration rates as illustrated by the API filtration test were determined. Table I which follows gives the commercial name of the emulsifying agent, the chemical composition, the chemical type, the filtration rate after 1, 2, 3, and 7½ minutes, the description of the filtrate and remarks as to the characteristics of the slurry.

Foaming may suitably be controlled by employment of suitable defoaming agents, such as the silicones; high molecular weight monohydric and polyhydric alcohols, such as octanol, polypropylene glycol and the organophosphates, such as tributyl phosphate, may be used. Also in controlling the tendency toward foaming, this tendency may be reduced or eliminated by avoiding the entrainment of air during the mixing operation in which the composition is formed.

The emulsifying agents employed in the present invention, as stated before, may be the polar, non-ionic compounds of high formula weight of hydrophilic and lipophilic nature. The compounds of greater hydrophilic and lipophilic nature appear to be more efficient in our composition and method than those of lesser strength with respect to these characteristics.

It will be seen that our improved composition has numerous advantages over conventional cement. Our improved composition has low density, low tensile strength, improved settling characteristics, low water losses and also by virtue of the oil content has lubricating properties. The density of our emulsion slurries, exemplified by the numerous examples, ranges from about 11 to approximately 12½ lbs. per gallon as compared to 16 for neat cement slurries. The low density of our emulsion

TABLE I

*Molecular emulsifying agents for use in oil-emulsion cements* [1]

| Commercial Name of Emulsifying Agent | Chemical Composition | Chemical Type | Filtration—API Fluid Loss (cc.) [2] | | | | Description of Filtrate | Remarks |
|---|---|---|---|---|---|---|---|---|
| | | | 1 min. | 2 min. | 3 min. | 7½ min. | | |
| (1) Span 20 | Sorbitan Mono-Laurate | Ester | 1.5 | 2.5 | 3.5 | 6.5 | 2 cc. emulsion on water filtrate. | Cement was oil-wet; set in 24 hours, but crumbly. |
| (2) Pluronic L44 | Condensation product of Ethylene Oxide, Propylene Oxide and Propylene Glycol. | Ether-Alcohol | 7 | 9 | 10 | 15 | Creamy emulsion. | Slurry very fluid; set in 24 hours. |
| (3) Pluronic F68 | ...do... | ...do... | 7 | 9.5 | 11 | 16.5 | Cloudy emulsion. | Do. |
| (4) BRIJ #35 | Polyoxyethylene Lauryl Alcohol. | ...do... | 9 | 12 | 13 | 18 | Creamy emulsion. | Do. |
| (5) Renex 30 | A Polyoxyethylene Alcohol. | ...do... | 13 | 16.5 | 18.5 | 24 | ...do... | Do. |
| (6) Triton X-100 | Polyoxyethylene Octyl Phenol. | ...do... | 13 | 17 | 19 | 24.5 | ...do... | Do. |
| (7) Igepal CA-Extra High Concentrate. | A Polyether-alcohol condensation product. | ...do... | 15 | 18 | 20 | 25 | ...do... | Do. |
| (8) Tween 20 | Polyoxyethylene Sorbitan Mono-Laurate. | Ether-Ester | 11 | 14.5 | 17 | 25 | ...do... | Slurry very fluid; set in 72 hours. |
| (9) Tween 60 | Polyoxyethylene Sorbitan Mono-Stearate. | ...do... | 12 | 15 | 18 | 25 | ...do... | Do. |
| (10) Tergitol NPX | A Polyoxyethylene Alcohol. | Ether-Alcohol | 13 | 17 | 19 | | ...do... | Slurry very fluid; set in 24 hours. |
| (11) Igepal Co-630 | Alkyl Phenoxy Polyoxyethylene Ethanol. | ...do... | 17 | 21 | 23 | 30 | ...do... | Do. |
| (12) Emulphor ELA | Condensation product of Ethylene Oxides and Fatty Acids. | Ether-Ester | 12 | 16.5 | 20 | 31 | ...do... | Do. |
| (13) Pluronic L-62 | Condensation product of Ethylene Oxide, Propylene Oxide and Propylene Glycol. | Ether-Alcohol | 37 | 57 | 71 | | ...do... | Do. |
| (14) Span 85 | Sorbitan Tri-Oleate | Ester | 42 | 60 | 74 | | Cloudy emulsion. | No set test. |

[1] Cement Composition: 100 grams Lone Star Normal Portland cement; 90 cc. water; 30 cc. kerosene; 0.6 gram emulsifying agent.
[2] Oil emulsion cement slurry without emulsifying agent: fluid loss 130 cc. after 3 minutes.

It will be seen from these data that compounds of the ester, ether-alcohol, ether-ester type were employed with success. Best results, as far as filtration rate is concerned, were obtained with the sorbitan mono-laurate which is an ester-type emulsifying agent. It will be noted that the original filtration fluid loss of the oil-emulsion cement slurry without the emulsifying agent was 130 cc. after 3 minutes which indicates a remarkable reduction for the emulsifying agents of the present invention.

In all of the results presented in Table I, it will be clear that a fluid cement was obtained which set within 24 to 72 hours.

In employing the emulsifying agents of the present invention, a word of caution appears to be in order. For example, the emulsifying agents are not effective in the presence of bentonitic clays and the compositions containing the emulsifying agent exhibit a tendency to foam.

slurries is important since the density of the conventional neat Portland cement slurry is higher than desirable for many cementing operations. Furthermore, the neat slurry of the prior art does not possess sufficient gel strength to suspend all the cement particles and settling may occur before the mass sets. The neat slurry of the prior art has a very high filtration and the set mass possesses greater strength than desirable. In our compositions the density of the slurries is sufficient to allow the slurry to be used in well cementing operations more efficiently. Furthermore, we are able to produce low density slurries having a sufficiently high tensile strength to be suitable for oil well cementing operations. It will be apparent to the skilled workman that we may vary the strength of our cement by suitably adjusting the concentration of oil in the slurry. The tensile strength of the set cements from our composition is about 200 and lower than 200 lbs. per sq. in. as compared to 600 lbs. or higher for neat cement, which makes our composition quite desirable for oil well cementing operations. Oliphant and Farris, AIME Transactions, vol. 170 (1947), page 225, pointed out the advantages of such low strength cements. In the prior art cements, such as neat cement slurries, the solid particles settle appreciably and this settling may result in a faulty cement job. On the other hand, cement slurries, such as ours, show no tendency for the solids to settle on standing. As illustrated by the data, our compositions are outstanding from the standpoint of low water loss. Cement slurries in accordance with the present invention show filtration rates of approximately 100 cc. in 30 minutes as compared to approximately 80 cc. in one minute for the prior art compositions when the two types of slurries are tested at 100 lbs. per sq. in. in the standard API low-pressure wall-building mud tester. As pointed out before, our composition has lubricating properties. It is believed that the use of emulsion cements will lubricate the well casing and permit it to be rotated readily during placement of cement.

The compositions of the present invention achieve a beneficial result only by the presence of the several components therein. The presence of the liquid hydrocarbon or oil results in the cement composition having a low density, a low filtration rate, and a low strength. The organic dispersing agent prevents separation of oil from the slurry and increases the thickening time. The water and the cement are used in proportions to provide a slurry of the desired fluidity and a set mass of the desired strength. Thus each of the components of our composition cooperates to produce a desired result.

The nature and objects of the present invention having been completely described and illustrated, what we wish to claim as new and useful and to secure by Letters Patent is:

1. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, an emulsifying agent selected from the class consisting of the calcium tolerant water soluble polar hydrophylic nonionic ester, ether-alcohol, and ether-ester compounds in an amount in the range between 0.1% and 1.0% by weight based on the dry cement, and water in an amount in the range between 50% and 100% by weight based on the dry cement sufficient to provide a pumpable slurry.

2. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, sorbitan mono-laurate in an amount in the range between 0.1% and 1.0% by weight based on the dry cement, and water in an amount in the range between 50% and 100% by weight based on the dry cement.

3. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, polyoxyethylene alcohol in an amount in the range between 0.1% and 1.0% by weight based on the dry cement, and water in an amount in the range between 50% and 100% by weight based on the dry cement.

4. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, a condensation product of ethylene oxide, propylene oxide and propylene glycol in an amount in the range between 0.1% and 1.0% by weight based on the dry cement, and water in an amount in the range between 50% and 100% by weight based on the dry cement.

5. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, polyoxyethylene lauryl alcohol in an amount in the range between 0.1% and 1.0% by weight based on the dry cement, and water in an amount in the range between 50% and 100% by weight based on the dry cement.

6. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, polyoxyethylene sorbitan monolaurate in an amount in the range between 0.1% and 1.0% by weight based on the dry cement, and water in an amount in the range between 50% and 100% by weight based on the dry cement.

7. A composition in accordance with claim 1 in which the hydrocarbon is kerosene.

8. A composition in accordance with claim 1 in which the hydrocarbon is crude petroleum.

9. A composition in accordance with claim 1 in which the hydrocarbon is diesel oil.

10. A composition in accordance with claim 1 in which the hydrocarbon is gasoline.

11. A composition in accordance with claim 1 in which the hydrocarbon is fuel oil.

References Cited in the file of this patent
UNITED STATES PATENTS
2,285,302    Patterson                June 2, 1942